United States Patent
Baratto et al.

(10) Patent No.: US 8,214,367 B2
(45) Date of Patent: Jul. 3, 2012

(54) SYSTEMS, METHODS, MEANS, AND MEDIA FOR RECORDING, SEARCHING, AND OUTPUTTING DISPLAY INFORMATION

(75) Inventors: Ricardo Baratto, San Jose, CA (US); Oren Laadan, New York, NY (US); Dan Phung, Montclair, NJ (US); Shaya Joseph Potter, New York, NY (US); Jason Nieh, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 401 days.

(21) Appl. No.: 12/038,515

(22) Filed: Feb. 27, 2008

(65) Prior Publication Data

US 2008/0301101 A1   Dec. 4, 2008

Related U.S. Application Data

(60) Provisional application No. 60/903,588, filed on Feb. 27, 2007.

(51) Int. Cl.
*G06F 17/30* (2006.01)

(52) U.S. Cl. ........ 707/739; 707/648; 707/758; 715/736; 715/764

(58) Field of Classification Search .......... 1/1; 707/812, 707/706, 736, 758, 648, 739, 999.001; 702/187; 714/37; 715/733, 736, 764
See application file for complete search history.

(56) References Cited

U.S. PATENT DOCUMENTS

| | | | | |
|---|---|---|---|---|
| 5,859,639 | A * | 1/1999 | Ebrahim | 715/788 |
| 6,538,667 | B1 * | 3/2003 | Duursma et al. | 715/740 |
| 6,662,226 | B1 * | 12/2003 | Wang et al. | 709/224 |
| 2003/0164850 | A1 * | 9/2003 | Rojewski et al. | 345/733 |
| 2004/0015740 | A1 * | 1/2004 | Dautelle | 714/37 |
| 2005/0132333 | A1 * | 6/2005 | Neumann et al. | 717/124 |
| 2005/0197804 | A1 * | 9/2005 | Reeves | 702/187 |
| 2005/0203882 | A1 * | 9/2005 | Godley | 707/3 |
| 2006/0037076 | A1 * | 2/2006 | Roy | 726/22 |
| 2006/0126817 | A1 * | 6/2006 | Beckett et al. | 379/265.06 |
| 2006/0173859 | A1 * | 8/2006 | Kim et al. | 707/10 |

(Continued)

OTHER PUBLICATIONS 802.11 Wireless LAN Performance. http://www.atheros.com/pt/atheros_range_whitepaper.pdf., Atheros Communications, 2003.

(Continued)

*Primary Examiner* — Dennis Truong
(74) *Attorney, Agent, or Firm* — Wilmer Cutler Pickering Hale and Dorr LLP

(57) ABSTRACT

Systems for recording, searching, and outputting display information are provided. In some embodiments, systems for recording display information are provided. The systems include a virtual display that: intercepts display-changes describing changes to be made to a state of a display; sends the display-changes to a client for display; records the display-changes; and a context recorder that records context information describing a state of the display derived from a source independently of the display changes and independently of screen-images. In some embodiments, the systems further include a display system that generates an output screen-image based at least in part on at least one of the display-changes and in response to a search of the context information. In some embodiments, the virtual display further records screen-images; and the display system further generates the output screen-image based at least in part on a recorded-screen-image of the recorded screen-images.

11 Claims, 8 Drawing Sheets

U.S. PATENT DOCUMENTS

2006/0294094 A1* 12/2006 King et al. .................. 707/6
2007/0011012 A1* 1/2007 Yurick et al. ................ 704/277
2008/0005685 A1* 1/2008 Drews et al. ................ 715/764

OTHER PUBLICATIONS

Ausbeck, Jr., P.J. "A Streaming Piecewise-constant Model," In Proceedings of the Data Compression Conference (DCC), Mar. 1999.
Baratto, R.A. et al. "MobiDesk: Mobile Virtual Desktop Computing," In Proceedings of the 10th Annual ACM International Conference on Mobile Computing and Networking (MobiCom), Sep.-Oct. 2004.
Baratto, R.A. et al., "THINC: A Virtual Display Architecture for Thin-Client Computing," In Proceedings of the 20th ACM Symposium on Operating Systems Principles (SOSP 2005), pp. 277-290, Brighton, UK, Oct. 2005.
Barham, P. et al., "Xen and the Art of Virtualization," In Proceedings of the 19th ACM Symposium on Operating Systems Principles (SOSP 2003), pp. 164-177, Bolton Landing, NY, Oct. 2003.
Beguelin, A. et al., "Application Level Fault Tolerance in Heterogeneous Networks of Workstations," Journal of Parallel and Distributed Computing, 43(2):147-155, Jun. 1997.
Bush, V. "As we may think," The Atlantic Monthly, Jul. 1945.
Chandy, K.M. et al., "Distributed Snapshots: Determining Global States of Distributed Systems," ACM Transactions on Computer Systems, 3(1):63-75, Feb. 1985.
Christiansen, B.O. et al., "A Novel Codec fot Thin Client Computing," In Proceedings of the Data Compression Conference (DCC), Mar. 2000.
Christiansen, B.O. et al., "Fast Motion Detection for Thin Client Compression," In Proceedings of the Data Compression Conference (DCC), Apr. 2002.
Christiansen, B.O. et al., "Stream Thin Client Compression," In Proceedings of the Data Compression Conference (DCC), Mar. 2001.
Chun, B. et al., "PlanetLab: An Overlay Testbed for Broad-Coverage Services," SIGCOMM Comput. Commun. Rev., 33(3):3-12, 2003.
Citrix Metaframe, http://citrix.com; Retrieved Nov. 9, 2010.
Clark, C. et al. "Live Migration of Virtual Machines," In Proceedings of the 2nd Symposium on Networked Systems Design and Implementation (NSDI 2005), pp. 273-286, Boston, MA, May 2005.
Dumais, S. et al., "Stuff I've Seen: A System for Personal Information Retrieval and Re-Use," in SIGIR '03: Proceedings of the 26th annual international ACM SIGIR conference on Research and development in information retrieval, pp. 72-79, New York, NY USA, 2003, ACM Press.
Dunlap, G.W. et al., "ReVirt: Enabling Intrusion Analysis through Virtual-Machine Logging and Replay," Proceedings of the 2002 Symposium on Operating Systems Design and Implementation (OSDI).
Fant, K.M. "A nonaliasing, Real-Time Spatial Transform Technique," IEEE Computer Graphics and Applications, 6(1):71-80, Jan. 1986.
Feldman, S.I. et al., "Igor: a system for program debugging via reversible execution," In PADD '88: Proceedings of the 1988 ACM SIGPLAN and SIGOPS workshop on Parallel and distributed debugging, pp. 112-123, New York, NY, USA, 1988, ACM Press.
Fog Creek Copilot. http://www.copilot.com; Retrieved Nov. 9, 2010.
Freeman, E.T. "The Lifestreams Software Architecture," Ph.D. thesis, Yale University Department of Computer Science, May 1997.
Gemmell, J. et al., "Mylifebits: a personal database for everything," Communications of the ACM, 49(1):88-95, Jan. 2006.
Gilbert, J.M. et al., "A Lossless 2-D Image Compression Technique for Synthetic Discrete-Tone Images," Proceedings of the Data Compression Conference (DCC), Mar.-Apr. 1998.
Gioiosa, R. et al., "Transparent, incremental checkpointing at kernal level: a foundation for fault tolerance for parallel computers," In SC '05: Proceedings of the 2005 ACM/IEEE conference on Supercomputing, p. 9, Washington, DC, USA, 2005, IEEE Computer Society.
GNOME Storage. http://www.gnome.org/~seth/storage; Retrieved Nov. 11, 2010.
Google Desktop Search. http://desktop.google.com; retrieved Nov. 11, 2010.
GoToMYPC. http://www.gotomypc.com/., Retrieved Nov. 10, 2010.
Gravano, L. et al., "QProber: A system for automatic classification of hidden-web databases," ACM Transactions on Information Systems, 21(1), 2003.
Gupta, P. et al., "Versatility and Unix Semantics in a Fan-Out Unification File System," Technical Report FSL-04-1, Computer Science Dept., Stony Brook University, Jan. 2004.
Health Insurance Portability and Accountability Act, http://www.hhs.gov/ocr/hipaa/., Retrieved Nov. 9, 2010.
Huang, Y. et al., "Software Tools and Libraries for Fault Tolerance," IEEE Bulletin of the Technical Committee on Operating System and Application Environments, 7(4)5-9, Winter 1995.
Humphreys, G. et al., "Chromium: A Stream-Processing Framework for Interactive Rendering on Clusters," In Proceedings Framework for Interactive Rendering on Clusters. In Proceedings of the 29th International Conference on Computer Graphics and Interactive Techniques (SIGGRAPH), 2002.
Joshi, A. et al., "Checkpointing in Oracle," In A. Gupta, O. Shumeli, and J. Widom, editors, VLDB '98, Proceedings of 24th International Conference on Very Large Data Bases, pp. 665-668, New York City, New York, USA, Aug. 1998, Morgan Kaufmann.
Kale, L.V. et al. "Charm++: a Portable Concurrent Object Oriented System Based on C++," In Proceedings of the 8th Annual Conference on Object-Oriented Programming Systems, Languages, and Applications (OOPSLA '93), pp. 91-108, Washington D.C., Sep. 1993.
King, S.T. et al. "Debugging operating systems with time-traveling virtual machines," In USENIX 2005 Annual Technical Conference, General Track, pp. 1-15, Anaheim, CA, Apr. 2005.
Kongmunvattana, A. et al., "Coherence-based coordinated checkpointing for software distributed shared memory systems," In International Conference on Distributed Computing Systems, pp. 556-563, 2000.
Laadan, O. et al., "DejaView: A Personal Virtual Computer Recorder," 21st ACM Symposium on Operating Systems Principles, Oct. 2007.
Lai, A. et al., "Limits of Wide-Area Thin-Client Computing," Proceedings of the ACM SIGMETRICS 2002, Marina del Rey, CA, Jun. 15-19, 2002.
Lai, A.M. et al., "Improving Web Browing on Wireless PDAs Using Thin-Client Computing," In Proceedings of the 13th International World Wide Web Conference (WWW), May 2004.
LapLink, Bothell, WA. Laplink 2000 User's Guide, 1999.
Li, S.F. et al., "Integrating Synchronous and Asynchronous Collaboration with Virtual Network Computing," IEEE Internet Computing, 4(3):26-33, 2000.
Linux Software Suspend, http://www.suspend2.comnet; Retrieved Nov. 9, 2010.
Linux VServer. http://www.linux-vserver.org; retrieved Nov. 9, 2010.
Litzkow, M. et al., "Checkpoint and migration of unix processes in the condor distributed processing system," Technical Report 1346, University of Wisconsin Madison Computer Sciences, Apr. 1997.
Lvm2 resource page. http://sources.redhat.com/lvm2; retrieved Nov. 11, 2010.
McKusick, M.K. et al., "The Design and Implementation of the 4.4BSD Operating System," Addison-Wesley, 1996.
Muthitacharoen, A. et al., "A Low-bandwidth Network File System," In Proceedings of the 18th ACM Symposium on Operating Systems Principles (SOSP '01), pp. 174-187, Chateau Lake Louise, Banff, Canada, Oct. 2001.
Network Appliance, Inc. http://www.netapp.com; retrieved Nov. 9, 2010.
Nieh, J. et al., "A Comparison of Thin-Client Computing Architectures," Technical Report CUCS-022-00, Department of Computer Science, Columbia University, Nov. 2000.
Nieh, J. et al., "Measuring Thin-Client Performance Using Slow-Motion Benchmarking," ACM Trans. Computer Systems, 21(1):87-115, Feb. 2003.
Nilfs team, "The Nilfs Version 1: Overview," Techincal Report, NTT Cyber Space Laboratories, 2005.
NoMachine NX; http://www.nomachine.com, Retrieved Nov. 9, 2010.
OpenVZ. http://www.openvz.org; Retrieved Nov. 9, 2010.

Osman, S. et al., "The Design and Implementation of Zap: A System for Migrating Computing Environments," In Proceedings of the 5th Symposium on Operating Systems Design and Implementation (OSDI 2002), pp. 361-376, Boston, MA, Dec. 2002.

Packard, K. "An LBX Postmortem," LBX Architect, XFree86 Core Team, SuSE, Inc., Presented at Portland State University, Jan. 24, 2001.

Patterson, D. "A Conversation with Jim Gray," Queue 1(3), Jun. 2003.

PC Anywhere, http://www.pcanywhere.com; retrieved Nov. 9, 2010.

Pike, R. et al., "Plan 9 from Bell Labs," Computing Systems, 8(3): 221-254, Summer 1995.

Plank, J.S. "An Overview of Checkpointing in Uniprocessor and Distributed Systems, Focusing on Implementation and Performance," Technical Report UT-CS-97-372, Dept. of Computer Science, University of Tennessee, Jul. 1997.

Plank, J.S. et al., "Libckpt: Transparent Checkpointing under Unix," In Proceedings of the USENIX Winter 1995 Technical Conference, pp. 213-223, New Orleans, LA, Jan. 1995.

Popek, G.J. et al., "Formal Requirements for Virtualizable Third Generation Architectures," Communications of the ACM, 17(7):412-421, Jul. 1974.

Portable Network Graphics (PNG), http://www.libpng.org/pub/png/., Retrieved Nov. 9, 2010.

Porter, T. et al., "Compositing Digital Images," Computer Graphics vol. 18, No. 3, Jul. 1984.

Price, D. et al., "Solaris Zones: Operating System Support for Consolidating Commerical Workloads," In Proceedings of the 18th Large Installation System Administration Conference, pp. 241-254, Atlanta, GA, Nov. 2004.

Pruyne, J. et al., "Managing Checkpoints for Parallel Programs," Proceedings of the IPPS Second Workshop on Job Scheduling Strategies for Parallel Processing, Honolulu, Hawaii, Apr. 1996.

Qin, F. et al., "Rx: Treating Bugs as Allergies: A Safe Method to Survive Software Failures," In Proceedings of the 20th ACM Symposium on Operating Systems Principles (SOSP 2005), pp. 235-248, Brighton, UK, Oct. 2005.

Richardson, T. et al., "Virtual Network Computing," IEEE Internet Computing, 2(1), Jan./Feb. 1998.

Roman, E. et al., "A Survey of Checkpoint/Restart Implementations," Technical Report LBNL-54942, Lawrence Berkeley National Laboratory, Jul. 2002.

Runaware.com, http://www.runaware.com. Retrieved Nov. 9, 2010.

Sancho, J.C. et al., "Current Practice and a Direction Forward in Checkpoint/Restart Implementations for Fault Tolerance," In Proceedings of the 19th IEEE International Parallel and Distributed Processing Symposium (IPDPS '05)—Workshop 18, p. 300.2, Washington, DC, Apr. 2005.

Scheifler, R.W. et al., "The X Window System," ACM Trans. Gr. 5(2):79-106, Apr. 1986.

Schmidt, B.K. "Supporting Ubiquitous Computing with Stateless Consoles and Computation Caches," Ph.D. Thesis, Stanford University, Aug. 2000.

SGI OpenGL Vizserver, http://www.sgi.com/software/vizserver/. Retrieved on Nov. 9, 2010.

Sharma, D.C. "Thin-client market to fatten up, IDC says," CNET News, Sep. 17, 2003.

Soltis, S.R. et al., "The Global File System," In the Proceedings of the Fifth NASA Goddard Conference on Mass Storage Systems, pp. 319-342, College Park, MD, Sep. 1996.

Soules, C.A.N. et al., "Connections: Using Context to Enhance File Search," Proceedings of the 20th ACM Symposium on Operating Systems Principles (SOSP) Oct. 2005.

Srinivasan, S.M. et al., "Flashback: A Lightweight Extension for Rollback and Deterministic Replay for Software Debugging," In Proceedings of the USENIX 2004 Annual Technical Conference, General Track, pp. 29-44, Boston, MA, Jun. 2004.

Stevens, W.R. "Advanced Programming in the UNIX Environment," Professional Computing Series. Addison-Wesley, Reading, MA, USA, 1993, Chapter 10.

Tarantella Web-Enabling Software: The Adpative Internet Protocol, SCO Technical White Paper, Dec. 1998.

Teevan, J. et al., "The Perfect Search Engine is Not Enough: A Study of Orienteering Behavior in Directed Search," In CHI '04: Proceedings of the SIGCHI conference on Human factors in computing systems, pp. 415-422, 2004.

Tennenbaum, T. et al., "The Condor Distributed Processing System," Dr. Dobb's Journal, 20(227): 40-48, Feb. 1995.

The GNOME accessibility project. http://developer.gnome.org/projects/gap; retrieved Nov. 9, 2010.

Tridgell, A. "Efficient Algorithms for Sorting and Synchronization," Ph.D. Thesis, The Australian National University, Feb. 1999.

Truman, T.E. et al., "The InfoPad Multimedia Terminal: A Portable Device for Wireless Information Access," IEEE Transactions on Computers, vol. 47, No. 10, Oct. 1998, 1073-1087.

Tsearch2—full text extension for PostgreSQL. http://www.sai.msu.su/~megera/postgres/gist/tsearch/V2/.; retrieved Nov. 11, 2010.

Tynan, D. "Think Thin," InfoWorld.com, Jul. 14, 2005.

Virtual Network Computing, http://www.realvnc.com/, retrieved Nov. 11, 2010.

VMWare Movie Capture, http://www.vmware.com/support/ws5/doc/ws_running_capture.html.

VMware, Inc., http://www.vmware.com; Retrieved Nov. 9, 2010.

Whitaker, A. et al., "Configuration debugging as search: Finding a needle in the haystack," In the 6th Symposium on Operating System Design and Implementation (OSDI04), San Francisco, CA, Dec. 2004.

Wong, A.Y. et al., "Operating System Support for Multi-User, Remote, Graphical Interaction," In Proceedings of the USENIX Annual Technical Conference, San Diego, CA, Jun. 2000.

Wright, C.P. et al., "Versatility and Unix Semantics in a Fan-Out Unification File System," Technical Report FSL-04-1, Dept. of Computer Science, Stony Brook University, Jan. 2004.

Wright, C.P. et al., "Versatility and Unix Semantics in Namespace Unification," ACM Transactions on Storage (TOS). 2(1), Mar. 2006.

X Web FAQ. http://www.broadwayinfo.com/bwfaq.htm.; Retrieved Nov. 9, 2010.

xvidcap. http://xvidcap.sourceforge.net/.; retrieved on Nov. 11, 2010.

Yang, S.J. et al., "The Performance of Remote Display Mechanism for Thin-Client Computing," Proceedings of the 2002 USENIX Annual Technical Conference, Jun. 2002.

Zhong, H. et al., "CRAK: Linux Checkpoint/Restart as a Kernal Module," Technical Report CUCS-014-01, Department of Computer Science, Columbia University, New York, Nov. 2001. Publication LBNL-54942.

Kingsbury, B.A. et al., "Job and Process Recovery in a UNIX-based Operating System," In Proceedings of the USENIX Winter 1989 Technical Conference, pp. 335-364, San Diego, CA, Jan. 1989.

Cumberland, B.C. et al, "Microsoft Windows NT Server 4.0, Terminal Server Edition: Technical Reference," Microsoft Press, Redmond, WA, 1999, Chapters 1-4.

Nielsen, J. "Designing Web Usability," New Riders Publishing, Indianapolis, IN, 2000. Chapters 2, 6 and p. 134.

Shneiderman, B. "Designing the User Interface: Strategies for Effective Human-Computer Interaction," Addison-Wesley, Reading, MA, 2nd edition, 1992, Chapters 7 and 14.

* cited by examiner

US 8,214,367 B2

SYSTEMS, METHODS, MEANS, AND MEDIA FOR RECORDING, SEARCHING, AND OUTPUTTING DISPLAY INFORMATION

CROSS-REFERENCE TO RELATED APPLICATION

This application claims the benefit under 35 U.S.C. §119(e) of U.S. Provisional Patent Application No. 60/903,588, filed Feb. 27, 2007, which is hereby incorporated by reference herein in its entirety.

STATEMENT REGARDING FEDERALLY SPONSORED RESEARCH OR DEVELOPMENT

This invention was made with government support under ITR grant No. CNS-0426623 awarded by National Science Foundation. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The disclosed subject matter relates to systems, methods, media, and means for recording, searching, and outputting display information and for resuming execution.

BACKGROUND

Various search tools are available to search through information available on networks and/or on a user's own digital processing device. These tools include, for example, web search engines, search appliances, and desktop search tools. Users can use these search tools, for example, to locate documents that they did not specifically know about (e.g., a search for any information about "New York City") as well as to locate specific documents that they already know about but for which they do not know the locations. Of course, it is inherent that any search tool can only return information that the tool has access to, has indexed, or is otherwise aware of in some way.

However, users and/or the digital devices employed by the users may not store all the information with which users are presented. Yet, users may desire to locate information observed while using a device at an earlier time. In addition, a user may desire to continue working from a point in time that has passed, but for which the information needed to do so was not stored. Furthermore, even if information of past use is accessible, the user may not be able to locate it and/or restart execution from the point in time the information was displayed.

SUMMARY

In some embodiments, systems, methods, means, and media for recording, searching, and outputting display information are provided. In some embodiments, systems for recording display information are provided. The systems include a virtual display that: intercepts display-changes describing changes to be made to a state of a display; sends the display-changes to a client for display; records the display-changes; and a context recorder that records context information describing a state of the display derived from a source independently of the display changes and independently of screen-images. In some embodiments, the display-changes are display commands, the context information is derived from an accessibility mechanism, and the context information includes text. In some embodiments, the systems further include a display system that generates an output screen-image based at least in part on at least one of the display-changes and in response to a search of the context information. In some embodiments, the virtual display further records screen-images; and the display system further generates the output screen-image based at least in part on a recorded-screen-image of the recorded screen-images.

In some embodiments, systems for recording display information are provided. The systems include means for intercepting display-changes describing changes to be made to a state of a display; means for sending the display-changes to a client for display; means for recording the display-changes; and means for recording context information describing a state of the display derived from a source independent of the display changes and independent of screen-images. In some embodiments, the display-changes are display commands, the context information is derived from an accessibility mechanism, and the context information includes text. In some embodiments, the systems further include means for generating an output screen-image based at least in part on at least one of the display-changes and in response to a search of the context information. In some embodiments, the systems further include means for recording screen-images; and means for generating the output screen-image based at least in part on a recorded-screen-image of the recorded screen-images.

In some embodiments, methods for recording display information are provided. The methods include intercepting display-changes describing changes to be made to a state of a display; sending the display-changes to a client for display; recording the display-changes; and recording context information describing a state of the display derived from a source independent of the display changes and independent of screen-images. In some embodiments, the display-changes are display commands, the context information is derived from an accessibility mechanism, and the context information includes text. In some embodiments, the methods further include generating an output screen-image based at least in part on at least one of the display-changes and in response to a search of the context information. In some embodiments, the methods further include recording screen-images; and generating the output screen-image based at least in part on a recorded-screen-image of the recorded screen-images.

In some embodiments, systems for recording display information are provided. The systems include a virtual display that: intercepts display-changes describing changes to be made to a state of a display; sends the display-changes to a client for display; records the display-changes; and a context recorder that records context information derived from an accessibility mechanism and describing a state of the display. In some embodiments, the display-changes are display commands, the context information is derived from an accessibility mechanism, and the context information includes text. In some embodiments, the systems further include a display system that: generates an output screen-image based at least in part on at least one of the display-changes and in response to a search of the context information. In some embodiments, the virtual display further records screen-images; and the display system further generates the output screen-image based at least in part on a recorded-screen-image of the recorded screen-images.

In some embodiments, computer-readable media containing computer-executable instructions that, when executed by a processor, cause the processor to perform methods for recording display information are provided. The methods including: intercepting display-changes describing changes to be made to a state of a display; sending the display-changes to a client for display; recording the display-changes; and recording context information describing a state of the display derived from a source independent of the display changes and independent of screen-images. In some embodiments, the display-changes are display commands, the context information is derived from an accessibility mechanism, and the context information includes text. In some embodiments, the methods further include generating an output screen-image based at least in part on at least one of the display-changes and in response to a search of the context information. In some embodiments, the methods further include recording screen-images; and generating the output screen-image based at least in part on a recorded-screen-image of the recorded screen-images.

In some embodiments, computer-readable media containing computer-executable instructions that, when executed by a processor, cause the processor to perform methods for recording display information are provided. The methods including: intercepting display-changes describing changes to be made to a state of a display; sending the display-changes to a client for display; recording the display-changes; and recording context information derived from an accessibility mechanism and describing a state of the display. In some embodiments, the display-changes are display commands, the context information is derived from an accessibility mechanism, and the context information includes text. In some embodiments, the methods further include generating an output screen-image based at least in part on at least one of the display-changes and in response to a search of the context information. In some embodiments, the methods further include recording screen-images; and generating the output screen-image based at least in part on a recorded-screen-image of the recorded screen-images.

In some embodiments, systems for recording, searching, and outputting display information are provided. The systems include a display recorder that receives and stores: display-image-state information including a first screen-image of a display at a first time and a second screen-image of the display at a second time that is after the first time; display-command information including: at least one first command that describes advancing the first screen-image to a third screen-image of the display at a third time that is between the first time and the second time; and at least one second command that describes advancing the second screen-image to a fourth screen-image of the display at a fourth time that is after the third time; and a text recorder that receives: text information of text displayed at the third time from a text stream derived independently of the display-image-state information and independently of the display-command information; and text information of text displayed at the fourth time from a text stream derived independently of the display-image-state information and independently of the display-command information.

DETAILED DESCRIPTION

Figure 1:
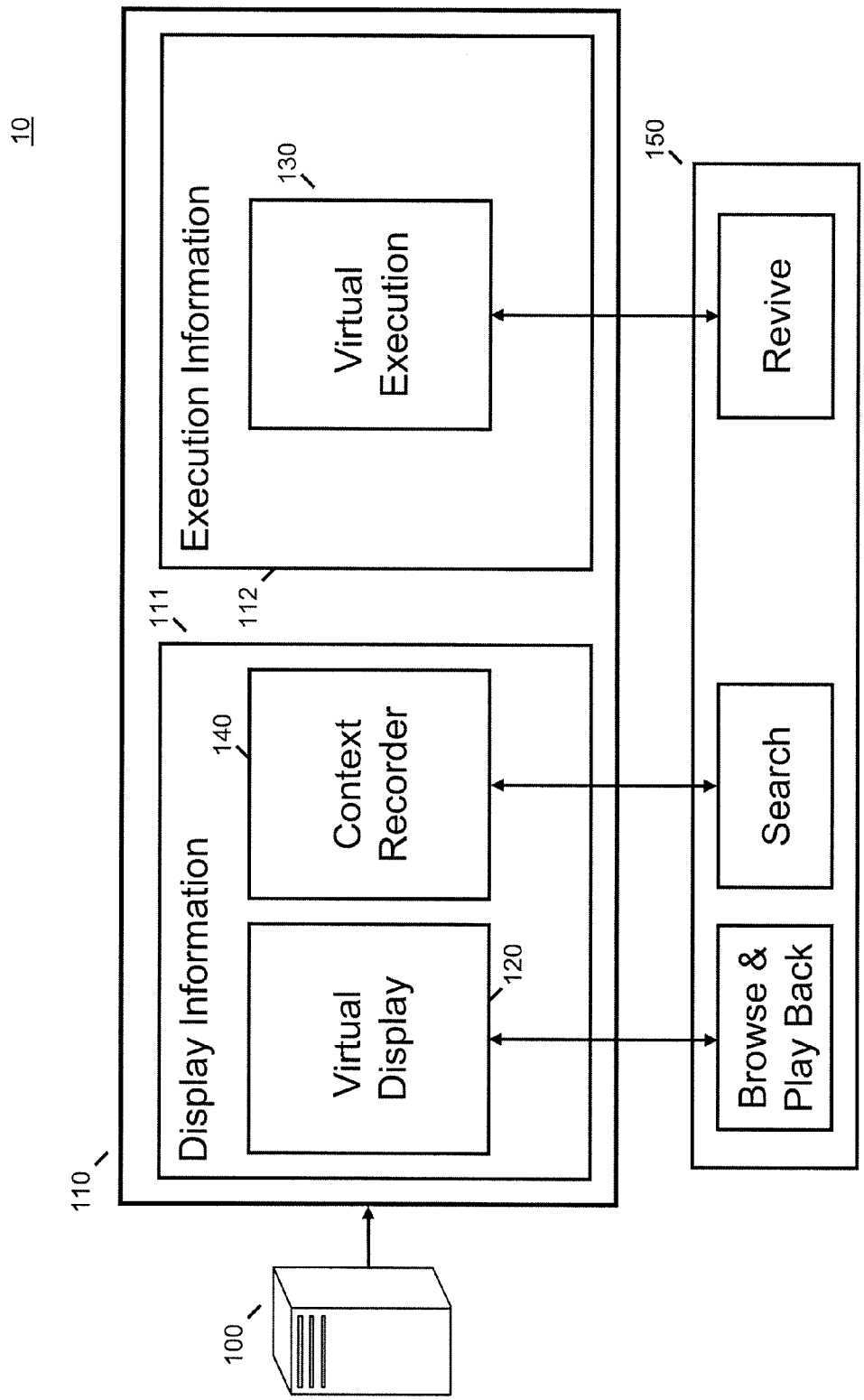
FIG. 1 is a simplified illustration of a system for recording, searching, and outputting display information and reviving execution in accordance with some embodiments of the disclosed subject matter.

Systems, methods, media, and means for recording, searching, and outputting display information, as well as resuming execution, are provided. Display and execution of a digital data device's environment can be recorded such that the record can be searched through, played back, and/or manipulated at a later time. For example, referring to system 10 of FIG. 1, display information 111 and execution information 112 of digital data device 100 can be recorded using a virtualization architecture 110. In some embodiments, virtualization architecture 110 can include a virtual display 120 which can record display information and a virtual execution environment 130 which can record execution information. Virtual display 120 can be built using various types of systems, such as, for example, systems based on a virtual network computing (VNC), based on remote desktop protocol (RDP), and/or based on a virtual display described in Appendix A. Virtual execution environment 130 can be built using various types of systems, such as, systems based on, for example a virtual execution environment described in Appendix B. System 10 can also include a context recorder 140 that can record context information such as, for example, text displayed in an application window. System 10 also includes playback tools 150 which can, for example, browse, playback, search, and/or revive execution based on recorded display information 111 and recorded execution information 112. Some embodiments can leverage existing system interfaces of, for example, digital data device 100 to provide operation without, for example, modifying, recompiling, or relinking applications, window systems, or OS kernels. The systems of FIG. 1 can be rearranged in various ways. For example, in some embodiments virtual display 120 and/or context recorder 140 can be executed inside virtual execution environment 130.

Figure 2:
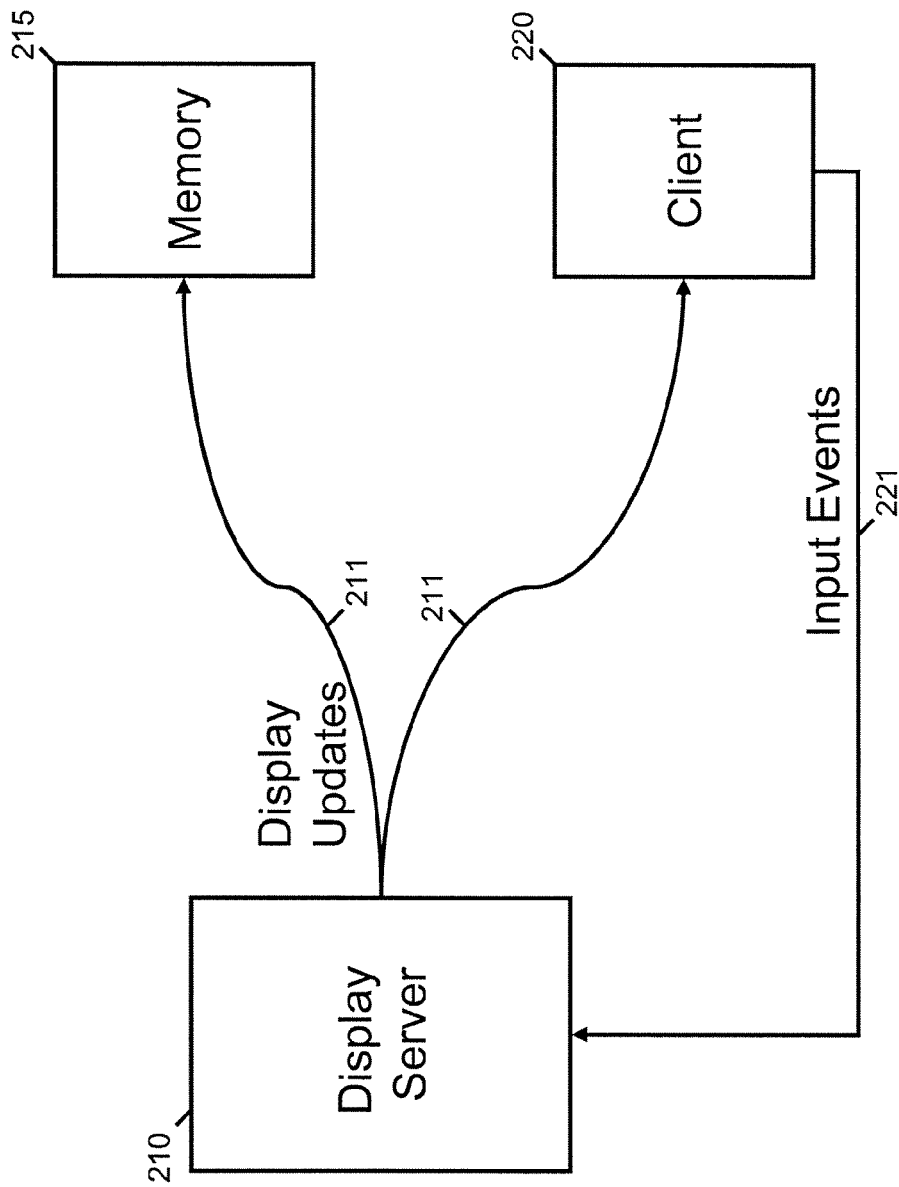
FIG. 2 is a simplified illustration of display server storing display updates in a memory and sending the display updates to a display client in accordance with some embodiments of the disclosed subject matter.

Virtual display 120 can decouple a display state (e.g., everything displayed on a monitor and/or portions of a display, such as, various windows displayed on a monitor) from the underlying hardware (e.g., the hardware of system 100)

and can enable display output to be redirected to various locations. For example, FIG. 2 illustrates a display server 210 of system 100 sending display updates 211 to a memory 215 and to a display client 220. Display client 220 can send input events 221 (e.g., mouse clicks, mouse movements, keyboard strokes, etc.) to display server 210 which can cause display server 210 to send further display updates 211 to memory 215 and display client 220. Some embodiments can operate as a client-server architecture and provide a virtual display by leveraging, for example, the standard video driver interface, a well-defined, low-level, device-dependent layer that exposes video hardware to the display server 210. Instead of a driver designed for a specific type of hardware, a virtual display driver can be used, for example, that intercepts display commands, records them, and redirects them to client 220 for display. In some embodiments, persistent display state can be maintained by display server 210 while display client 220 can be simple and stateless. In some embodiments, intercepting can include, for example, at least one of having information intentionally directed to a device monitoring the information instead of, for example directly to a monitor, snooping information, tapping a communications link, receiving information which the broadcaster intended for a different source, redirecting the information, and/or altering a broadcaster of information to send the information to a device apart from, for example, a monitor.

Returning to FIG. 1, in some embodiments, virtual execution environment 112 can, for example, decouple a user's desktop computing environment from an underlying OS, enabling a live desktop session to be continuously checkpointed and later revived. A standard interface between applications and the OS can be used to encapsulate a user's desktop computing session in a private virtual namespace. By providing a virtual namespace, revived sessions can use the same OS resource names as used before being checkpointed, even if they are mapped to different underlying OS resources upon revival. By providing a private namespace, revived sessions from different points in time can run concurrently and use the same OS resource names inside their respective namespaces, yet not conflict among each other. For example, the virtual execution environment can keep a mapping of Unix process identification numbers (pids) to virtual-pids generated by the virtual execution environment. When an application is resumed, the application can use the virtual-pids and the virtual execution can map these to new pids generated by the OS. In some embodiments, the virtualization mechanism encapsulates and records only the user's desktop computing session, as opposed to, for example, an entire machine instance. Various revived user sessions can operate concurrently without conflicts for display resources because, for example, each can have its own independent display state.

Figure 3:
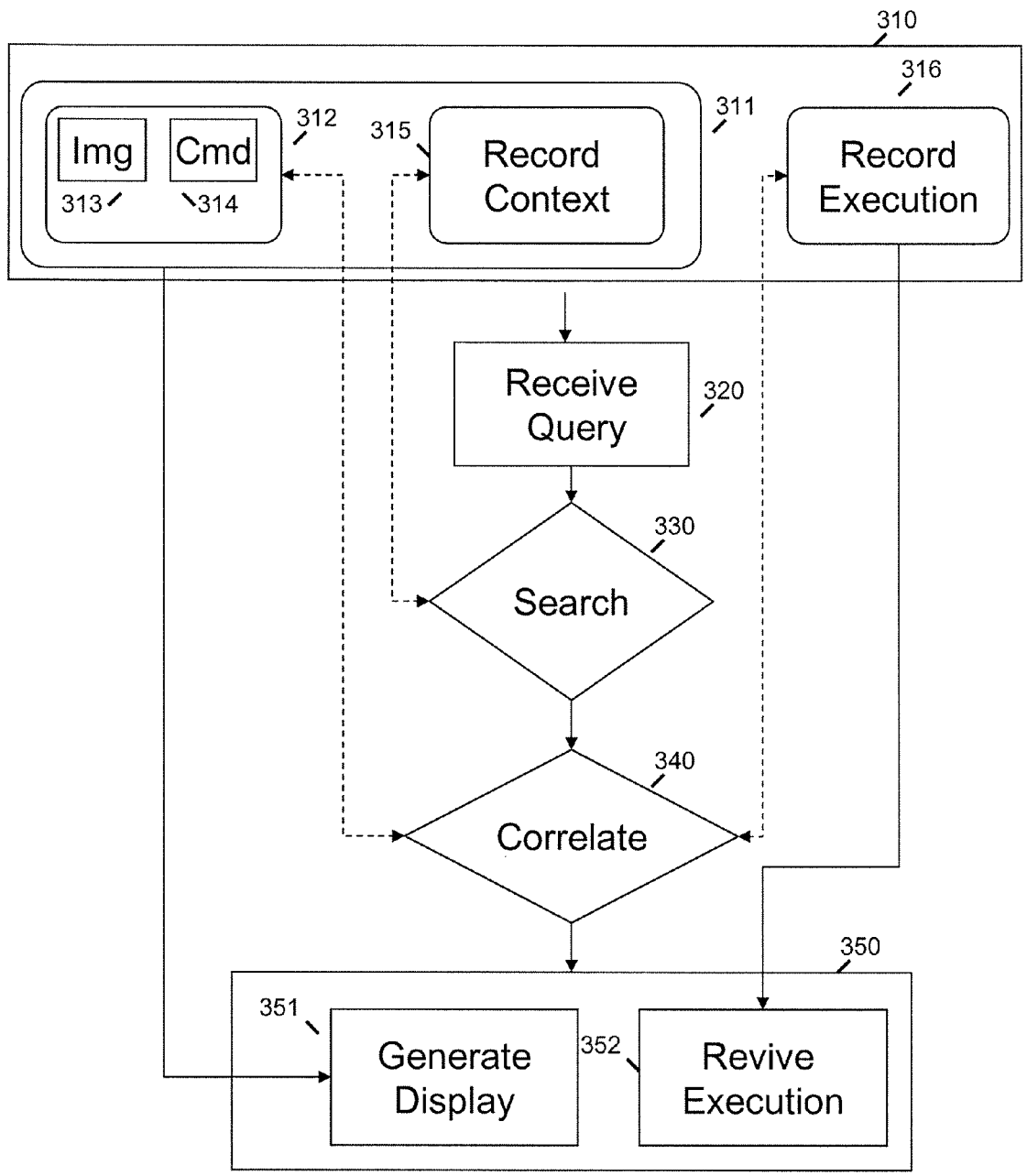
FIG. 3 is a simplified illustration of a method for recording, searching, and outputting display information and for resuming execution, which can be performed using the system of FIG. 1, in accordance with some embodiments of the disclosed subject matter.

FIG. 3 illustrates a method for recording display information 111, searching context information 140, browsing and playing back display information 111 recorded, for example, on memory 215, and reviving execution based on a record of execution information 112. Display and execution information can be recorded, at 310. A query can be received from a user, at 320. Display information can be searched, at 330. Various portions of display information can be correlated with each other, at 340. At 350, a user can, for example, receive search results, select among the search results, move forward and backward through a display, and/or revive execution.

Recording, at 310, can include recording display information, at 311, and recording execution information, at 316. Recording display information, at 311, can include recording screen-images (at 313) and/or display-changes (at 314), at 312, and recording context information, at 315. Screen-images (sometimes referred to as screenshots) (recorded at 313) can include, for example, a full screen-image of the display and/or a screen-image of a portion of the display and can be formatted in various formats, such as, for example, Portable Network Graphics (PNG) files, bitmap (bmp) files, Tagged Image File Format (tiff) files, and/or Joint Photographic Experts Group (jpg) files. Display changes (recorded at 314), such as changes defined by display commands, can include various display commands and can depend, for example, on what type of virtual display 120 is chosen. If, for example, virtual display 120 is a virtual display described in Appendix A, display commands can include, for example, commands that transmit unencoded pixel data, commands that copy a region of a display from a local frame buffer to another location, commands that paint various fixed sized regions of a display, commands that replicate a tile over a display region, etc.

Recording quality can be adjusted for both resolution and frequency of display updates. In addition, the display can be resized to accommodate various resolutions. For example, a display originally produced for a desktop computer can be played on a handheld PDA with the display resized accordingly. Display information can be recorded independently of current display settings. This can allow, for example, a program to be displayed at a low resolution (e.g., 240×320), but later replayed at a high resolution (e.g., 1280×1024) without a loss of quality that would result, for example, if a 240×320 image was simply resized to 1280×1024.

The frequency at which updates are recorded can be limited by queuing and merging display commands so that only the result of the last update is logged. For example, if a window is being moved across the screen, a user can configure the recording to only record display commands sufficient to show the start position and stop position of the window. This can be done, for example, because the user may consider knowing the exact location of the window at every instant as it moved across the screen unimportant and thus chooses not to use memory space recording it.

Display information can be recorded as an append-only log of display commands where recorded commands specify an operation to be performed on the current contents of the screen. A screen-image can be used as an initial state of the display that subsequent recorded display commands modify. If a user would like to display a particular point in time, the temporally closest prior screen-image can be used and display commands between the time of the screen-image and the desired time can be replayed to advance the display to the user's desired time. This can be performed at various speeds, for example, at real-time display speeds, or twice real-time display speeds. Screen-images can be recorded at various time intervals and this interval can be, for example, user defined, determined based on system resources, and/or determined based on the extent to which a display has changed. For example, a user can configure display information recording so that a screen-image is recorded every ten minutes as long as more than 10 display commands have been issued since the last screen-image was recorded.

In some embodiments, only the parts of the screen that change are recorded and if nothing changes, no display commands are generated and nothing is recorded. Virtual display 120 can determine not only which parts of a display have changed but also how the parts have changed. For example, if the desktop background is filled with a solid color, this can be represented in the record as a simple solid fill command.

Commands and screenshot data can be recorded using a timeline file that records a time stamp with each command and screen-image. The file can include, for example, chronologically ordered, fixed-sized entries of time at which a screen-image was taken, a file location in which the screen-image was stored and the file location of the first display command that follows the screen-image. Various formats and/or numbers of files can be used to store display information. For example, display information file 410 identifies, at 411, a screen-image 420 recorded at time "12:10:00:01" and stored starting at the beginning of a file named "img-1.bmp." File 410 then identifies the locations 412 of three display commands 431 stored in another file 430.

Context information (recorded at 315) can include text information that is derived independently of screen-images or display changes. Context information can be monitored, for example, using accessibility mechanisms provided by most modern desktop environments and used by screen readers to provide desktop access for the visually-impaired. The recorded contextual information can include, for example, on-screen text, an identifier of the window the information came from, the duration in which the information was on the screen, the name and type of the application that generated the information, window focus, and special properties about text (e.g., if it is menu item or HTML link), highlighted text, selected text. Context information can be monitored and recorded without an application or desktop environment modifications. Context information can be used as an index to the display record (e.g. to images stored at 313 and/or display changes stored at 314).

In some embodiments, a daemon can be used to collect the text on the desktop and index it in a database (e.g., file 440). At startup, the daemon can register with the desktop environment of system 100 and ask it to deliver events when new text is displayed or existing text changes. As events are received, the daemon can wake up, collect the new text and state from the application, and insert the information in the database. This occurs, for example, at 315 of FIG. 3.

Context information, including, accessible components (e.g., window names, text in windows, names of menus, text in fields of windows, the start and duration of which various other components are displayed, etc.) can be stored as trees. The processing time of searching the tree and the number of queries sent to applications can be reduced by keeping a number of data structures that mirror the accessible state of the desktop. To reduce event processing time, a hash table can map accessible components to nodes in the mirror tree. As events are received, the daemon can query the corresponding node and determine which parts of the tree need to be updated. By indexing the full state of the desktop's relationships and state transitions, temporal relationships and state transitions of displayed text can be accessed as database queries. For example, if a user is looking for a time when he started reading a document, but only recalls that a particular web page was open at the same time, he can search for the particular webpage. If text was only indexed when it first appeared on the screen, this temporal relationship between the web page and the paper may not have been recorded and the user would be unable to access the content of interest. Users settings can be used to control which commands to record and/or at what frequency to record display changes.

In some embodiments, visual playback and search can be performed by display client 220. Various time-shifting operations can be supported, such as, for example, skipping to a particular time in the display record, and fast forwarding or rewinding from one point to another. To skip to any time T in the record, a binary search over a timeline index file can be used to look for the entry with the maximum time less than or equal to T. Once the desired entry is found, the entry's screen-image information can be used to access the screen-image data and use it as the starting point for playback. The entry's command information can be used to locate the command that immediately follows the recovered screen-image. Starting with that command, the list of commands up to the first command with time greater than T can be processed.

To play the display record from the current display until time T, the commands in the command file can be played until the display reaches a command with time greater than T. The time of each can be read and the system can sleep between commands as needed to provide playback at the same rate at which the session was originally recorded. Playback can also occur faster or slower by, for example, scaling the time interval between display commands. For example, playback can be provided at twice the normal rate by only allowing half as much time as specified to elapse between commands. To playback at the fastest rate possible, command times can be ignored and the commands can be processed as quickly as possible.

Some embodiments provide a mechanism that allows users to search recorded display output. The search can use the index built from captured text and contextual information to find and return relevant results. For example, in a simple case, users can perform Boolean keyword searches, which locate times in the display record in which the query is satisfied. Keywords can tie applications to the whole desktop. For example, a user can look for a particular set of words limited to just those times when they were displayed inside a Firefox window, and further narrow the search by adding the constraint that a different set of words be visible somewhere else on the desktop or on another application. Users can also limit their searches to specific ranges of time or to particular actions. For example, a user can search for results only on a given day and only for text in applications that had the window focus. For example, returning to FIGS. 3 and 4, a user can enter a query, at 320, that reads "'FIG. 1' AND 'Slides' AND 'Date: today around noon'." File 440 of FIG. 4 can be searched, at 330, to locate entry 441 describing text displayed at time "12:10:00:01." At 340, time "12:10:00:01" can be used to correlate, at 340, entry 441 with entry 411 and, at 351, image 420 can be displayed to the user. If it was it determined instead, for example, that the query corresponded to data displayed at 12:10:00:03, screen-image 420 can be altered by executing the two first two display commands identified at 412.

Figure 4:
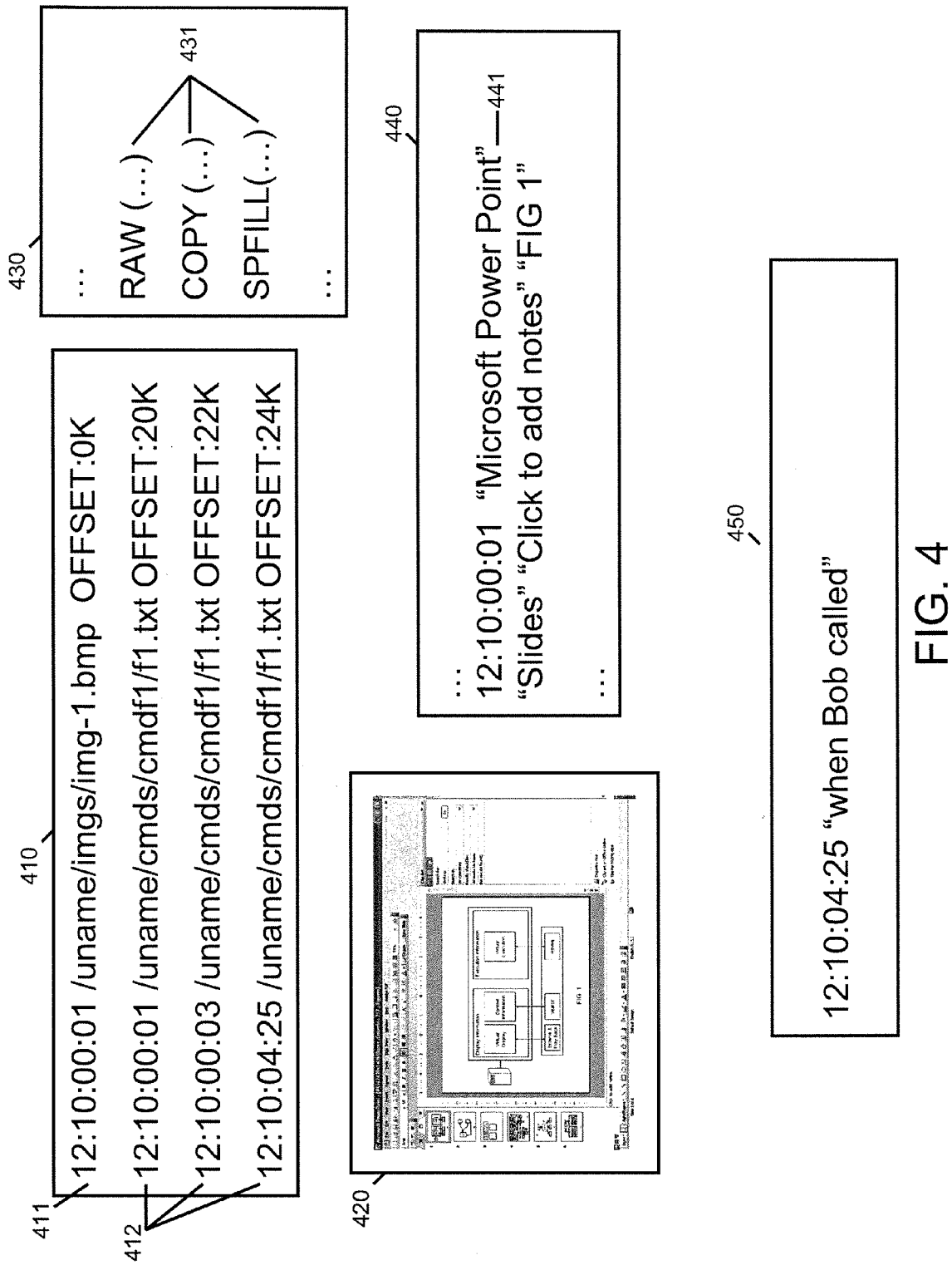
FIG. 4 illustrates various simplified sample file types that can be used for recording and searching the information stored therein in accordance with some embodiments of the disclosed subject matter.

Another search mechanism is provided through annotations. Annotations can be created, for example, by the user by typing text in some visible part of the screen. The indexing daemon will automatically add it to the record stream because it is monitoring text changes on the screen. In some embodiments, the user can provide some unique text that will allow the annotation to stand out from the rest of the recorded text. To help users in this case, an additional mechanism which can use the accessibility infrastructure is provided to explicitly create an annotation. For example, the user can enter the text, select it with the mouse, and press a combination key that will message the indexing daemon to associate the selected text with an attribute of annotation. An indexing daemon can provide this functionality transparently since both text selection and key strokes events can be delivered by the accessibility infrastructure. File 450 of FIG. 4 illustrates a user annotation "when Bob called." This can text can be entered, for example, if a user is working on slides and various other items when he receives a call from his boss "Bob" who proceeds give instructions requiring the user to quickly open windows, close windows, and make changes to existing documents he has opened. The user can enter this annotation at the time Bob called so that, if he later desires, he can return the state of his display (or even his entire environment) to the state it was in at the time that Bob called. One advantage of annotations is that because they can be searched separately, it can be easier to locate them. For example, refereeing to our "Bob" example, if the user had instead only remembered that the text "FIG. 1" was entered on this screen, when he later searched for "FIG. 1," he may be presented with many possible hits. However, "when Bob called" is likely to provided more unique results and "when Bob called" AND FIG. 1 is even more likely to provide unique results; this is especially true if only the annotations are searched for "when Bob called."

Search results can be presented to the user in the form of a series of text snippets and screen-images, ordered according to several user-defined criteria. These can include chronological ordering, persistence information (e.g., how long the text was on the screen), number of times the words appear, etc. The search can be conducted by first passing a query into the database that results in a series of timestamps where the query is satisfied. Screen-images for search results can also be cached using, for example, a least-recently-used scheme with a configurable cache size. This can be useful, for example, when a user repeatedly visits the same or similar point in time of a display. The screen-image results can be reviewed and a user can selected among them. If a query is satisfied over a continuous period of time, the results can be displayed as a shot of first and last screen-images, which can be referred to as a sub stream.

In some embodiments, optical character recognition (OCR) can be used in interacting with a display. For example, accessibility information may not provide text based information for raw images (e.g., a photograph of sign seen while browsing the internet); this information can be read from the image using OCR and can be stored for searching and/or correlating with other information. OCR can also be used to find the location of queried text on a display and identify the location to, for example, a user, with for example, an arrow or highlighting the target text in place.

In some embodiments, system information, such as, for example, load, memory usage, information describing processes running and their properties (name, size, executable, etc.), information describing applications running, information describing open network connections, uptime, etc. can be recorded. This information can be used, for example, for searching and correlating between events that are of interest. For example, if an application lock-up occurs, a user can look for a similar event in the past and then review the actions taken to fix the problem. This system information can be, for example, included with context information or can be stored and/or searched separately.

Figure 5:
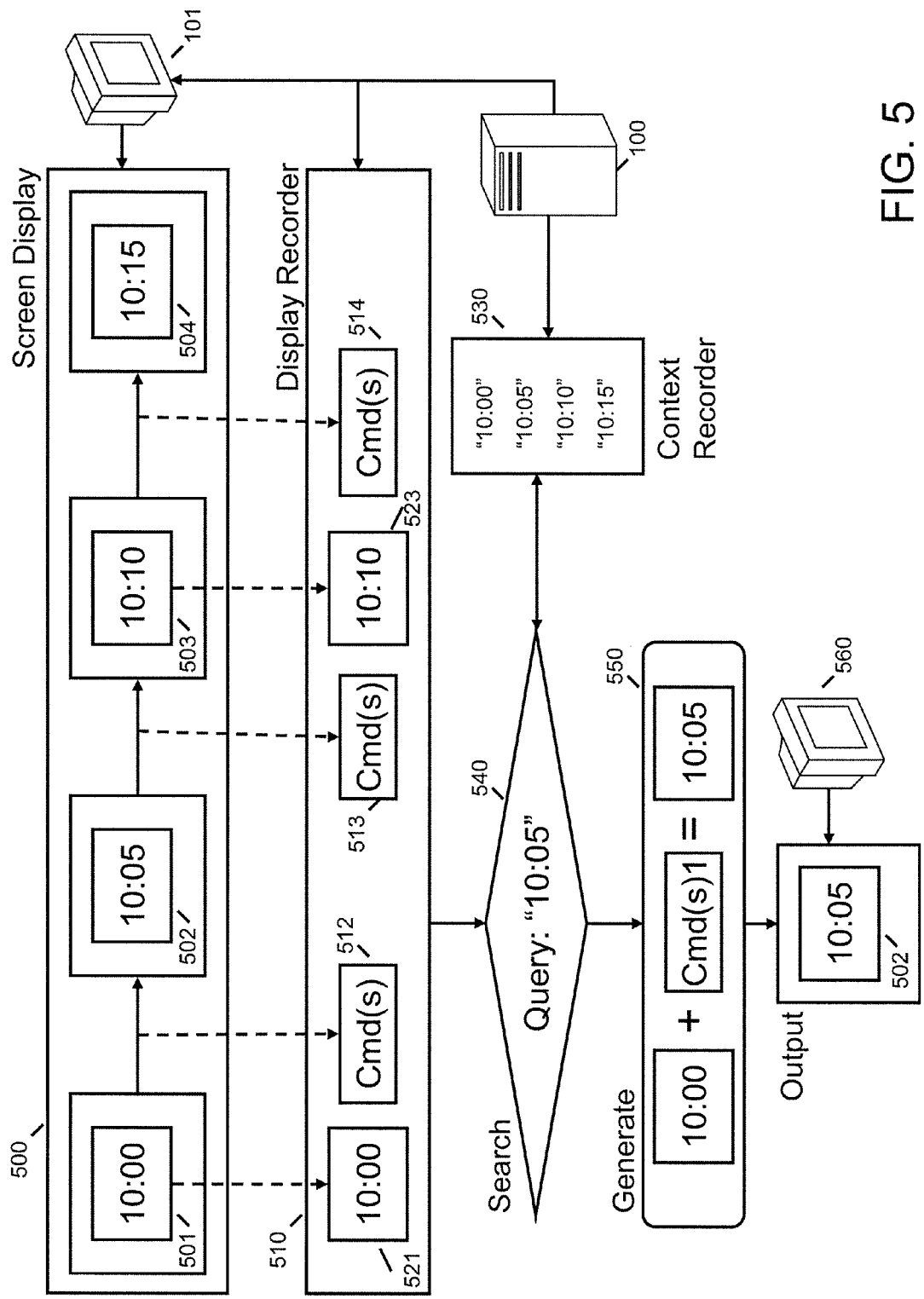
FIG. 5 is a simplified illustration of a method for recording, searching, and outputting display information that can be performed using the system of FIG. 1 in accordance with some embodiments of the disclosed subject matter.

FIG. 5 illustrates a method of locating and displaying a screen-image 502 that was displayed on a display 101 of system 100. Box 500 illustrates what is displayed on display 101 at four different times (10:00, 10:05, 10:10, and 10:15). For example, at 501, an image of a clock reading 10:00 is displayed and, at 504, an image of the clock then reading 10:15 is displayed. A display recorder records screen-images of display 501, at 521, and display 503, at 523. The display recorder does not record screen-images 502 or 504. However, the display recorder does: record display commands 512 that advance display 101 from displaying screen-image 501 to displaying screen-image 502; record display commands 513 that advance display 101 from displaying screen-image 502 to displaying screen-image 503; and record display commands 514 that advance display 101 from displaying screen-image 503 to displaying screen-image 504. Context recorder 530 records context information, which, in this example is four entries of text ("10:00", "10:05", "10:10", and "10:15") corresponding to the four clock images 501-504. At, 540, a user enters a query "10:05" and this query is used to search the context information and hits upon text "10:05." At 550, the screen-image 501 is located by looking for the screen-image recorded most proximately before the text "10:05" was displayed. Display commands 512 are then applied to screen-image 501 to alter screen-image 501 to generate image 502. Image 502, can be output, at 560, to the user. The user can also, for example, scroll forward and backward in time between screen-image 501 and screen-image 504. Display commands 512, 513, 514 as well as screen-images 501 and 503 can be used to generate screen-images to be displayed to a user in such a scrolling operation. For example to scroll backward from screen 504, a user can drag a scroll bar backward and commands 514 can be undone in reverse-chronological order.

Figure 6:
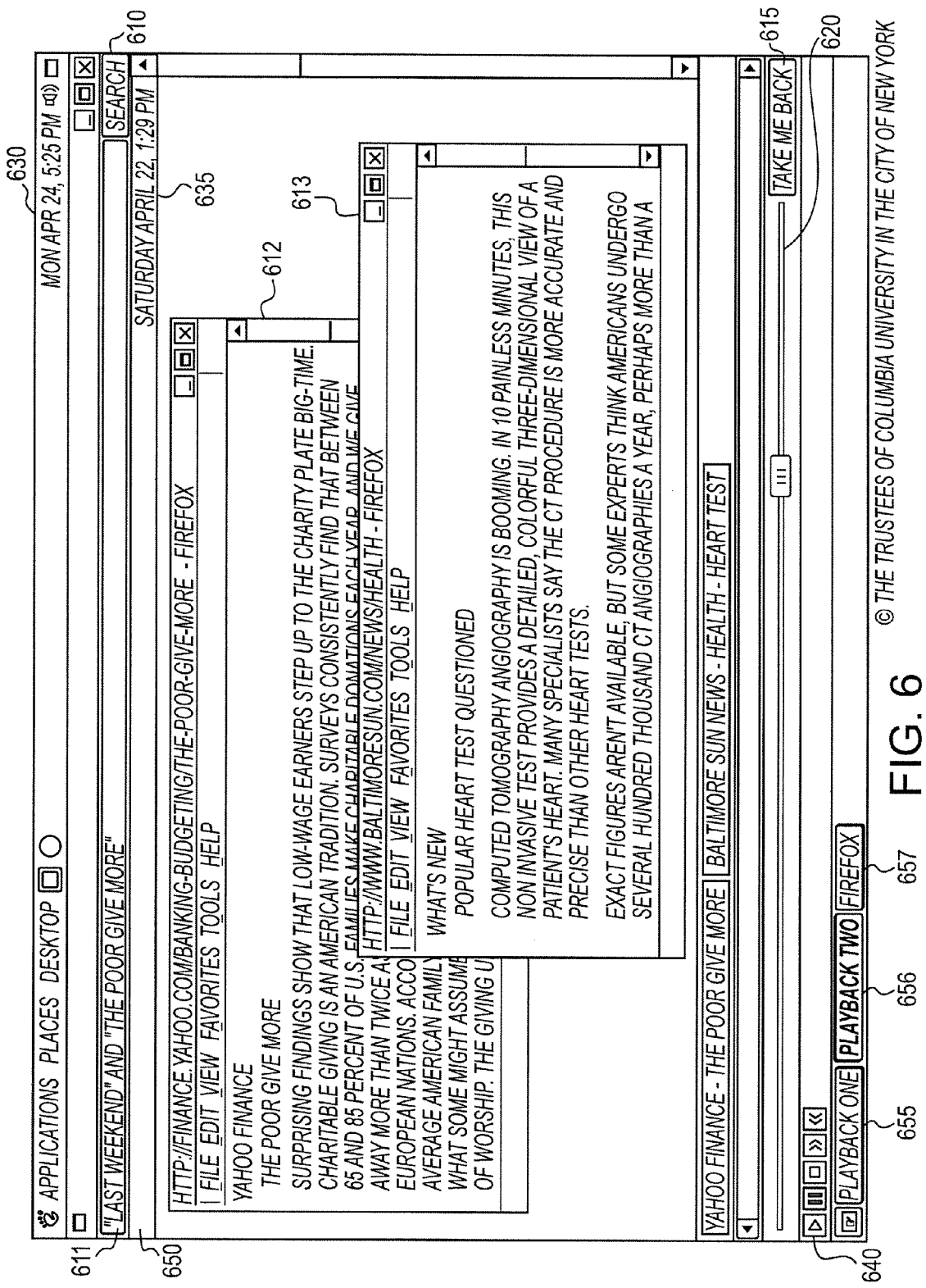
FIG. 6 is an illustration of a screen-image of a window for searching display information and moving forward and backward in time through a display in accordance with some embodiments of the disclosed subject matter.

FIG. 6 illustrates an example display 630 being displayed to a user on April 24. The user has entered the search "LAST WEEKEND" AND "THE POOR GIVE MORE" in search filed 611 and clicked a search button 610. Display 630 can present the user with various results in response to his query for which the user can select one or more and use the "TAKE ME BACK" button 615 to go back to a display at that time. In this example, the user has selected two sets of results which can be switched between using "PLAYBACK ONE" button 655 and "PLAYBACK TWO" 656. In the current display, 656 is selected and the corresponding window 650 is being displayed. As can be seen the date "Saturday, April 22" matches the query term "LAST WEEKEND," and the window 612 matches the query term "THE POOR GIVE MORE." The user may, however, have been looking for window 613, but could only remember that the window he was looking for was displayed at the same time as window 612 sometime over the weekend. The flow of the display can also be controlled using the play, pause, rewind, and fast-forward buttons 640. In addition, other windows, apart from the playback windows can continued to be used by switching to them, for example, using button 657.

In some embodiments, a system can generate queries to, for example, predict what a user would like to see based on the current situation of a user and how the user previously acted when in a similar situation. For example, if a user is viewing a financial webpage, the system can generate and execute a query to locate past instances of user behavior when observing financial webpages. The system can determine, for example, that the user typically launches a calculator when looking at such pages and can either, for example, launch a calculator or display a quick launch button for a calculator. System generated queries can be controlled in part based on, for example, user settings.

Figure 7:
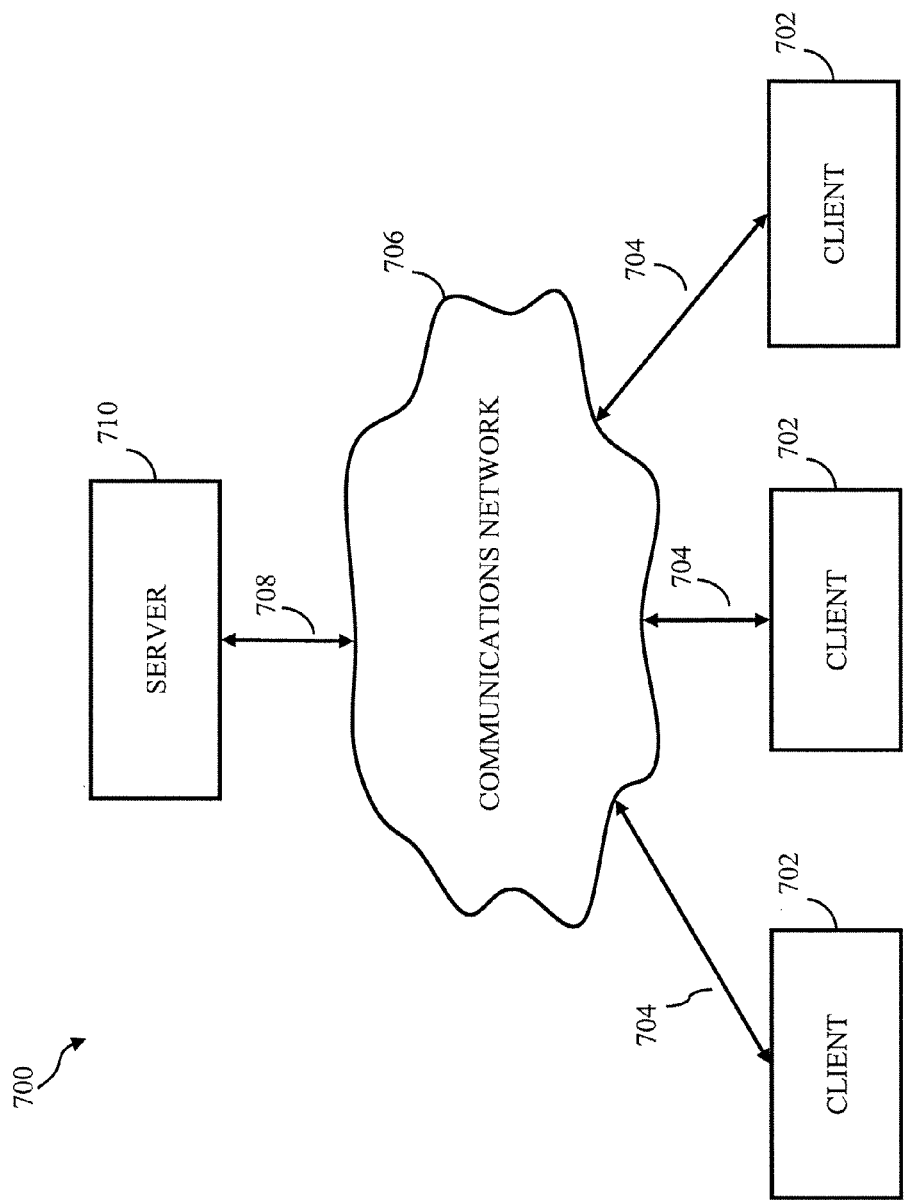
FIG. 7 is a simplified illustration of a system that can be used to implement the system of FIG. 1 in accordance with some embodiments of the disclosed subject matter.

FIG. 7 is a schematic diagram of an illustrative system 700 that can be used for recording, searching, and outputting display information as well as resuming execution in accordance with some embodiments of the disclosed subject matter. As illustrated, system 700 can include one or more clients 702. Clients 702 can be connected by one or more communications links 704 to a communications network 706 or connected directly to each other. Communications network 706 can also be linked through a communications link 708 to a server 710. Various embodiments of the disclosed subject matter can be implemented on at least one of the server and the clients. It is also possible that a client and a server can be connected through communication links 708 or 704 directly and not through a communication network 706.

In system 700, server 710 can be any suitable server or digital processing device for executing an application, such as, for example, a processor, a computer, a data processing device, or a combination of such devices. Communications network 706 can be various networks including the Internet, an intranet, a wide-area network (WAN), a local-area network (LAN), a wireless network, a frame relay network, an asynchronous transfer mode (ATM) network, a virtual private network (VPN), a mobile ad-hoc network (MANET), etc. or any combination of any of the same. Communications links 704 and 708 can be any communications links suitable for communicating data between clients 702 and server 710, such as network links, dial-up links, wireless links, hard-wired links, etc. or any combination of any of the same. Clients 702 can be any suitable digital processing devices, such as, for example, personal computers, laptop computers, mainframe computers, data displays, Internet browsers, personal digital assistants (PDAs), two-way pagers, wireless terminals, portable telephones, etc., or any combination of the same. In some embodiments, clients 702 and server 710 can be located within an organization. Alternatively, clients 702 and server 710 can be distributed between multiple organizations.

Figure 8:
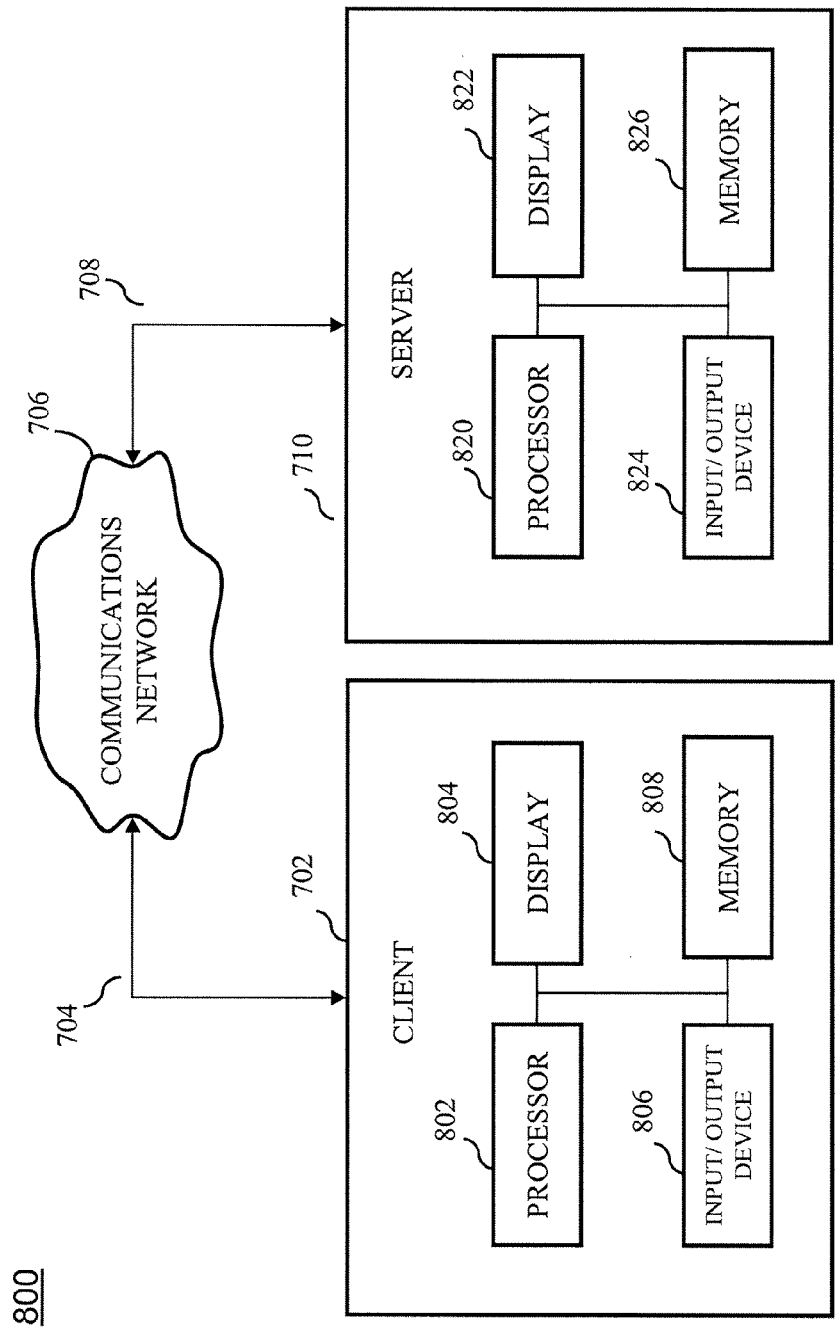
FIG. 8 is a more detailed illustration of a client and the server of FIG. 7 that can be used in accordance with some embodiments of the disclosed subject matter.

Server 710 and one of the clients 702, which are depicted in FIG. 7, are illustrated in more detail in FIG. 8. Referring to FIG. 8, client 702 and server 710 can include respectively, among other things, processors 802 and 820, displays 804 and 822, input/output devices 806 and 824, and memory 808 and 826, which can be interconnected. The input/output devices can receive input and send output such as, for example, text from keyboard, images from a camera, images from a scanner, audio recordings, voice-to-text translations, network traffic, packets, etc. In some embodiments, memory 808 and/or 826 contain a storage device for storing a program for controlling processors 802 and 820 and/or performing methods such as those described herein. Variations and combinations of system 800 might be suitable for different embodiments of the disclosed subject matter. In addition, although some embodiments are described herein as being implemented on a client and/or a server, this is only illustrative. Various components of some embodiments of the disclosed subject matter can be implemented on any suitable platform. For example, system 100 can be implemented on a client 702, a server 710, or various combinations of clients 702 and servers 710. For example, a display server 210 of FIG. 2 can be located on a server 710, display client 220 can be located on a client 702, and memory 215 can be located on memory 626 of a different server 710. In another example, display server 210, memory 215, and display client 220 can all be located on a single client 702. Recording can include, for example, storing display-changes, display-images, and/or context information on a memory 808 and/or memory 826.

System 10 can be implement using various systems and environments. For example, system 100 can run a Linux desktop environment with a snapshot-able and branch-able file system based on New Implementation of a Log-structured File System (NILFS) available from http://www.nilfs.org and UnionFS available from http://www.filesystems.org/project-unionfs.html. Context information can be captured using the accessibility infrastructure of the GNOME desktop environment available from http://developer.gnome.org/projects/gap.

A user can also revive execution from a previous state. For example, returning to FIG. 3, a user can revive, at 352, his environment from a time located by a query, search, and correlate, at 320, 330, and 340. A globally consistent checkpoint across all processes in a user's desktop session can be recorded while all processes are stopped. A privileged process can be executed outside of a user's virtual execution environment to perform a consistent checkpoint of a session. A session can be quiesced and all its processes can be forced into a stopped state. The execution state of the virtual execution environment and all processes can be saved. A file system snapshot can be taken to provide a version of the file system consistent with the checkpointed process state. The session can then be resumed.

A snapshot of the file system can be captured at every checkpoint because, for example, process execution state can depend on file system state. A log structured file system can be used, in which all file system modifications append data to the disk, be it, for example, meta data updates, directory changes, or syncing data blocks. A unique association between file system snapshots and checkpoint images can be created by storing a counter that is incremented on every checkpoint in both the checkpoint image's meta data and the file system's logs. To restore the file system, the snapshot identified by the counter found in the checkpoint image can be selected and an independent writable view of that snapshot can be created.

Some or all I/O operations can be shifted outside of the window of time when processes are stopped so that they can be done without blocking user interactivity. A file system synchronization can be performed before the session is quiesced. If a process is blocked in an uninterruptible state, such as when performing disk I/O, it will not handle a quiesce signal until the blocking operation is complete. The system can waits to quiesce the session until either all the processes are ready to receive signals or a configurable time has elapsed.

Writing the persistent checkpoint image to disk can be deferred until after the session has been resumed. A checkpoint can first be held in memory buffers that can be preallocated. The size of the buffer can be estimated based on the average amount of buffer space actually used for recent checkpoints To reduce downtime due to copying memory blocks as well as the amount of memory required for the checkpoint, copy-on-write (COW) techniques can be used to defer the memory copy until after the session has resumed. Memory pages can be marked as COW. Because each memory page is automatically copied when it is modified, a consistent checkpoint image can be obtained, even after the session has been resumed. Unlinked files that are still in use can be relinked within the same file system before the file system snapshot is performed. The files can be relinked within a directory that is not normally accessible within the virtual execution environment. When the session is revived, the files can be made temporally accessible within the user's session, the files can be opened and unlinked, restoring the state to what it was at the time of the checkpoint.

An incremental checkpoint mechanism can be provided that reduces the amount of memory saved by only storing the parts of memory that have been modified since the last checkpoint. This can reduce processing overhead because less pages need to be scanned and saved to memory and can reduces storage requirements because fewer pages need to be written to disk. Standard memory protection mechanisms available in operating systems can be leveraged. One mechanism used is to mark saved regions of memory as read-only and intercept and process the signals generated when those regions are modified.

During a full checkpoint, all the process's writable memory regions can be made read-only. These regions can be marked with a flag to distinguish them from regular read-only regions. After the process is resumed, attempts to modify such regions can cause a signal to be sent to the process. This signal can be intercepted the region's properties inspected. If it is read-only and marked with the special flag, flag can be removed and the region can be made writable again, and the process can be resumed without delivering the signal. If the flag is not present, the signal can be allowed to proceed down the normal handling path. During the next incremental checkpoint, only the subset of memory regions that have been modified are saved. Exceptions that may occur when writing a marked region during system call execution can be handled so that that the system call does not fail.

System calls that affect the memory protection can be intercepted to account for the changes they impose on memory layout. For example, if an application unmaps or remaps a region, that region can be removed or adjusted in the incremental state. Likewise, if an application changes the protection of a region from read-write to read-only then that region can be unmarked.

Checkpoints can be incremental by default to conserve space and reduce overhead, but full checkpoints can be taken periodically when the system is otherwise idle. This can be done for redundancy and to reduce the number of incremental checkpoint files needed to revive a session. For example, if full checkpoints are on average ten times larger than incremental checkpoints, a full checkpoint every thousand incremental ones only incurs an additional 1% storage overhead.

Checkpoints can be made in response to actual display updates. Runtime overhead can be reduced by limiting the checkpoint rate to once per second by default. A default checkpoint policy can be provided. The policy can disable checkpointing in the absence of user input when certain applications are active in full screen mode. For instance, checkpoints can be skipped when a screensaver is active or when video is played in full screen mode. Checkpoints can also be skipped if display activity remains below a user defined threshold, for example, if only a small portion of the display is affected (for example, 5% of the screen). This can be useful to disregard trivial display updates that are not of much interest to the user, such as the blinking cursor, mouse movements, or clock updates.

In addition, the system can be configured so that even when display activity may be low, checkpoints can still be recorded in the presence of keyboard input (e.g. text editing), to allow users to return to points in time at which they generated their data. In this case the policy can reduce the rate to, for example, once every ten seconds to match the expected amount of data generated by the user, which can be limited by, for example, typing speed. The checkpoint policy can be changed and/or defined by a user. The policy is also extensible and can include additional rules. For example, a user may add a control that can disable checkpoints when the load of the computer rises above a certain level.

A check-pointed desktop session can be revived in various ways. For example, a new virtual execution environment can be created and the file system state can restored as described below. A forest of processes can be created to match the set of processes in the user's session when it was checkpointed and the processes can then execute to restore their state from the checkpoint image. This state can include, for example, process run state, program name, scheduling parameters, credentials, pending, and blocked signals, CPU registers, FPU state, ptrace information, file system namespace, list of open files, signal handling information, and virtual memory. In some embodiments, once the processes have been restored, they can be resumed and allowed to continue execution. A viewer application can create a new connection to the revived session, which can be displayed in a new window in the viewer.

For incremental checkpoints, reviving a user's session can involve accessing a set of incremental checkpoint files instead of a single checkpoint image file. To revive the session, data from the current (time selected) checkpoint image can be read. When the restoration process encounters a memory region that is contained in another file, as marked by its list of saved memory regions, it can open the appropriate file and retrieve the necessary pages to fill in that portion of memory. This process can continue reading from the current checkpoint image, reiterating this sequence as necessary, until the complete state of the desktop session has been reinstated.

To, for example, provide a read-write file system view, a unioning file system can be used to join the read-only snapshot with a writable file system by stacking the latter on top of the former. In some embodiments, this can create a unioned view of the two: files system objects, namely files and directories, from the writable layer are always visible, while objects from the read-only layer are only visible if no corresponding object exists in the other layer.

While operations on objects from the writable layer can be handled directly, operations on objects from the read-only layer can be handled according to the their specific nature. If the operation does not modify the object, it can be passed to the read-only layer. Otherwise, a copy of the object in the writable layer can be created and operation can be handled there.

Multiple revived session can be created from a single checkpoint. For example, because each revived session can be encapsulated in its own virtual execution environment and can have its own writable file system layer, multiple revived sessions can execute concurrently. This can enable a user to start with the same information, but to process it in separate revived sessions in different directions. Furthermore, by using the same log structured file system for the writable layer, the revived session can retains the ability to continuously checkpoint session state and later revive it.

When reviving a session, all external connections of stateful protocols, such as TCP, can be dropped by resetting the state of their respective sockets; internal connections that are fully contained within the user's session, e.g. to local host, can remain intact. For the application, this appears as a dropped network connection or a disconnect initiated by the peer, both of which are scenarios that applications can handle gracefully. For instance, a web browser that had an open TCP connection to some web server would detect that the connection was dropped and attempt to initiate a new connection. The browser can load new pages as the user clicks on hyperlinks in a manner that is transparent to the user. Similarly, a revived secure shell (ssh) can detect the loss of connection, and report an error to the user. Sockets that correspond to stateless protocols, such as UDP, can be restored precisely since the underlying operating system does not maintain protocol specific state that makes assumptions about, or requires the cooperation of a remote peer.

In some embodiments, network access can be initially disabled in a revived session to prevent applications from automatically reconnecting to the network and unexpectedly losing data as a result of synchronizing their state with outside servers. For example, a user who revived a desktop session to read or respond to an old email that had been deleted on the outside mail server would not want her email client to synchronize with that server and lose the old email. However, the user can re-enable network access at any time, either for the entire session, or on a per application basis. Alternatively, the user can configure a policy that describes the desired network access behavior per application, or select a preset one. For new applications that the user launches within the revived session, network access can be enabled by default.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A system for recording display information, comprising:
   a virtual display that:
      intercepts display-changes describing changes to be made to a state of a display;
      sends the display-changes to a client for display; and
      records the display-changes;
   a context recorder that uses accessibility mechanisms to record context information derived independently of screen-images,
      wherein the accessibility mechanisms include mechanisms utilized by a screen reader for providing desktop access for visually impaired individuals;
      wherein the context information includes (1) text that is displayed in at least one application window, (2) a duration in which the text is displayed on the at least one application window and (3) at least one of a font type of the text, a font size of the text, and an identifier of the at least one application window, that are extracted through the accessibility mechanisms;
   a search tool that:
      receives a user query from a user;
      determines whether the user query matches any of the context information; and
      based on the whether the user query matches any of the context information, determines a correspondence between context information that matched the query and at least one of the display changes; and
   a display system that:
      generates an output screen-image based at least in part on the at least one of the display-changes determined to have a correspondence with the context information that matched the query.

2. The system of claim 1, wherein the display-changes are display commands.

3. The system of claim 1, further comprising:
   an execution recorder that records execution of an application generating the display; and
   an execution revival system that revives execution from a time of the output screen-image.

4. A method for recording display information, comprising:
   intercepting display-changes describing changes to be made to a state of a display;
   sending the display-changes to a client for display;
   recording the display-changes;
   recording context information using accessibility mechanisms,
      wherein the context information is derived independently of screen-images;
      wherein the accessibility mechanisms include mechanisms utilized by a screen reader for providing desktop access for visually impaired individuals; and
      wherein the context information includes (1) text that is displayed in at least one application window, (2) a duration in which the text is displayed on the at least one application window and (3) at least one of a font type of the text, a font size of the text, and an identifier of the at least one application window, that are extracted through the accessibility mechanisms;
   receiving a user query from a user;
   determining whether the user query matches any of the context information; and
   based on the whether the user query matches any of the context information, outputting at least one result describing a state of the display generated based at least in part on at least one of the display-changes.

5. The method of claim 4, wherein the display-changes are display commands.

6. A non-transitory computer-readable medium containing computer-executable instructions that, when executed by a processor, cause the processor to perform a method for recording display information, the method comprising:
   intercepting display-changes describing changes to be made to a state of a display;
   sending the display-changes to a client for display;
   recording the display-changes;
   recording context information using accessibility mechanisms,
      wherein the context information is derived independently of screen-images;
      wherein the accessibility mechanisms include mechanisms utilized by a screen reader for providing desktop access for visually impaired individuals; and
      wherein the context information includes (1) text that is displayed in at least one application window, (2) a duration in which the text is displayed on the at least one application window and (3) at least one of a font type of the text, a font size of the text, and an identifier of the at least one application window, that are extracted through the accessibility mechanisms;
   receiving a user query from a user;
   determining whether the user query matches any of the context information; and
   based on the whether the user query matches any of the context information, outputting at least one result describing a state of the display generated based at least in part on at least one of the display-changes.

7. The computer-readable medium of claim 6, wherein the display-changes are display commands.

8. A system for recording, searching, and outputting display information, comprising:
   a display recorder that receives and stores:
      display-image-state information including a first screen-image of a display at a first time and a second screen-image of the display at a second time that is after the first time;
      display-command information including:
         at least one first command that describes advancing the first screen-image to a third screen-image of the display at a third time that is between the first time and the second time; and
         at least one second command that describes advancing the second screen-image to a fourth screen-image of the display at a fourth time that is after the third time;
   a text recorder that receives:
      text displayed in at least one application window at the third time, wherein the text displayed at the third time is extracted independently of screen-images through accessibility mechanisms and wherein the accessibility mechanisms include mechanisms utilized by a screen reader for providing desktop access for visually impaired individuals; and text displayed in at least one application window at the fourth time, wherein the text displayed at the fourth time is extracted independently of screen-images through the accessibility mechanisms;

a search tool that:
receives a user query; and
determines whether the user query matches the text displayed at the third time or matches the text displayed at the fourth time; and a display system that, based on whether the user query matches the text displayed at the third time or matches the text displayed at the fourth time;
alters either the first screen-image by applying the at least one first command to generate a third screen-image or alters the second screen-image by applying the at least one second command to generate a fourth screen-image; and
outputs either the third screen-image or the fourth screen-image.

9. The system of claim 8,
wherein the display recorder further:
stores the first screen-image with a time stamp related to the first time;
stores the second screen-image with a time stamp related to the second time;
stores the at least one first display command with a time stamp indicating the third time; and
stores the at least one second display command with a time stamp indicating the fourth time; and
wherein the search tool further, based on whether the user query matches the text displayed at the third time or matches the text displayed at the fourth time, determines to either:
alter the first screen-image by applying the at least one first command by determining the first screen-image is a screen-image recorded most closely in time to issuance of the at least one first command based on the time stamp related to the first time and the time stamp related to the second time; or
alter the second screen-image by applying the at least one second command by determining the second screen-image is a screen-image recorded most closely in time to issuance of the at least one second command based on the time stamp related to the second time and the time stamp related to the fourth time.

10. The method of claim 4, further comprising:
recording execution of an application generating the display; and
reviving execution from a time of the output screen-image.

11. The computer-readable medium of claim 6, wherein the method further comprising:
recording execution of an application generating the display; and
reviving execution from a time of the output screen-image.

* * * * *